(12) United States Patent
Lee et al.

(10) Patent No.: US 12,019,478 B2
(45) Date of Patent: Jun. 25, 2024

(54) DISPLAY DEVICE

(71) Applicant: LG ELECTRONICS INC., Seoul (KR)

(72) Inventors: Dabin Lee, Seoul (KR); Mikyung Kim, Seoul (KR); Honghae Do, Seoul (KR); Weonyoung Sho, Seoul (KR); Sungmo Im, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/216,946

(22) Filed: Jun. 30, 2023

(65) Prior Publication Data

US 2023/0341899 A1 Oct. 26, 2023

Related U.S. Application Data

(63) Continuation of application No. 17/737,290, filed on May 5, 2022, now Pat. No. 11,755,071, which is a
(Continued)

(30) Foreign Application Priority Data

Dec. 20, 2018 (KR) .......... 10-2018-0165761

(51) Int. Cl.
*G06F 1/16* (2006.01)
*B32B 3/28* (2006.01)
*G02F 1/1333* (2006.01)
*B32B 7/14* (2006.01)
*G09G 3/3208* (2016.01)

(52) U.S. Cl.
CPC .......... *G06F 1/1637* (2013.01); *G06F 1/1601* (2013.01); *B32B 3/28* (2013.01); *B32B 7/14* (2013.01); *B32B 2457/206* (2013.01); *G02F 1/133308* (2013.01); *G09G 3/3208* (2013.01)

(58) Field of Classification Search
CPC ....... G06F 1/1601; G06F 1/1637; B32B 3/28; G02F 1/133308
See application file for complete search history.

(56) References Cited

U.S. PATENT DOCUMENTS 5,666,261 A * 9/1997 Aguilera .................. B32B 7/12
428/116
7,342,792 B2 3/2008 Kim et al.
(Continued)

FOREIGN PATENT DOCUMENTS

| CN | 1790065 | 6/2006 |
|---|---|---|
| CN | 102374491 | 3/2012 |

(Continued)

OTHER PUBLICATIONS

U.S. Appl. No. 16/526,601, Notice of Allowance dated Oct. 21, 2020, 6 pages.
(Continued)

*Primary Examiner* — Nidhi Thaker
(74) *Attorney, Agent, or Firm* — LEE, HONG, DEGERMAN, KANG & WAIMEY (57) ABSTRACT

A display device according to the present embodiment includes a display panel; and a corrugated panel facing a rear surface of the display panel and having a corrugated core disposed between a front skin and a rear skin.

17 Claims, 8 Drawing Sheets

Related U.S. Application Data continuation of application No. 17/103,654, filed on Nov. 24, 2020, now Pat. No. 11,360,514, which is a continuation of application No. 16/526,601, filed on Jul. 30, 2019, now Pat. No. 10,884,456.

(56) References Cited

U.S. PATENT DOCUMENTS

| | | | |
|---|---|---|---|
| 8,421,355 B2* | 4/2013 | Miyamura | H01J 11/18 313/582 |
| 9,058,758 B2 | 6/2015 | Shin et al. | |
| 9,310,647 B2 | 4/2016 | Ahn et al. | |
| 9,398,711 B2* | 7/2016 | In | G02F 1/133512 |
| 9,456,525 B2 | 9/2016 | Yoon et al. | |
| 9,661,764 B2 | 5/2017 | Jung et al. | |
| 9,846,273 B2* | 12/2017 | Ahn | G02B 6/0093 |
| 10,078,238 B2 | 9/2018 | Kato et al. | |
| 10,151,938 B2* | 12/2018 | Jung | G02F 1/00 |
| 10,274,769 B2 | 4/2019 | Kil et al. | |
| 10,539,817 B2 | 1/2020 | In et al. | |
| 2006/0146226 A1 | 7/2006 | Hung et al. | |
| 2013/0170156 A1* | 7/2013 | Jung | G02F 1/133308 361/749 |
| 2013/0314638 A1* | 11/2013 | Ahn | G02F 1/133308 349/58 |
| 2013/0335892 A1 | 12/2013 | Ha et al. | |
| 2014/0055916 A1 | 2/2014 | Gu et al. | |
| 2014/0334100 A1 | 11/2014 | Yoon et al. | |
| 2015/0349289 A1 | 12/2015 | Yu | |
| 2018/0130970 A1 | 5/2018 | Wang et al. | |
| 2020/0201382 A1* | 6/2020 | Lee | G06F 1/1601 |
| 2021/0072794 A1 | 3/2021 | Lee et al. | |
| 2022/0261037 A1 | 8/2022 | Lee et al. | |

FOREIGN PATENT DOCUMENTS

| | | |
|---|---|---|
| CN | 103187008 | 7/2013 |
| CN | 103187009 | 7/2013 |
| CN | 103424898 | 12/2013 |
| CN | 104143295 | 11/2014 |
| CN | 106292080 | 1/2017 |
| JP | 2003177690 | 6/2003 |
| JP | 2004034594 | 2/2004 |
| JP | 2017054079 | 3/2017 |
| KR | 1020100073395 | 7/2010 |
| KR | 10-2013-0079110 | 7/2013 |
| KR | 10-2013-0132232 | 12/2013 |
| KR | 10-2013-0139755 | 12/2013 |
| KR | 10-2015-0015276 | 2/2015 |
| KR | 20160000114 A * | 1/2016 |

OTHER PUBLICATIONS

U.S. Appl. No. 17/103,654, Notice of Allowance dated Mar. 7, 2022, 12 pages.
European Patent Office Application Serial No. 19190767.4, Search Report dated Feb. 13, 2020, 3 pages.
U.S. Appl. No. 17/737,290, Notice of Allowance dated May 3, 2023, 13 pages.
State Intellectual Property Office of the People's Republic of China Application Serial No. 201911042822.5, Office Action dated Jun. 2, 2021, 9 pages.
Korean Intellectual Property Office Application No. 10-2018-0165761, Notice of Allowance dated Sep. 13, 2023, 1 pages.

* cited by examiner

FIG. 2

21: front skin 24L rear skin

27: corrugated core 5 adhesive

FIG. 3

3: module cover

4: first adhesive, 5: second adhesive

DISPLAY DEVICE

CROSS-REFERENCE TO RELATED APPLICATIONS

This application is a continuation of U.S. patent application Ser. No. 17/737,290, filed on May 5, 2022, which is a continuation of U.S. patent application Ser. No. 17/103,654, filed on Nov. 24, 2020, now U.S. Pat. No. 11,360,514 which is a continuation of U.S. patent application Ser. No. 16/526,601, filed on Jul. 30, 2019, now U.S. Pat. No. 10,884,456, which claims the benefit of earlier filing date and right of priority to Korean Patent Application No. 10-2018-0165761, filed on Dec. 20, 2018, the contents of which are all hereby incorporated by reference herein their entirety.

BACKGROUND

The present invention relates to a display device.

A display device is a device which visually displays information in characters, graphs or figures, and may be a display device such as a liquid crystal display, a plasma display, or an OLED display.

The display device may include a display panel such as a liquid crystal display (LCD) or organic light emitting diodes (OLED), a front case covering a front edge of the display panel, and a back cover protecting a rear surface of the display panel.

The display device can be classified into a wall-mounted display device used in a state of being hung on a wall, a stand-type display device used in a state of being stood on a stand, and the like, according to the mounting manner.

The back cover supports the display panel and may be configured with a combination of a plurality of members.

In a case where the back cover is configured with a combination of a plurality of members, the rigidity of the back cover can be improved, and in particular, in a case where a portion of the plurality of members is made of metal, the rigidity thereof can further increase.

Meanwhile, there are problems that, in a case where the rigidity of the back cover is weak, the large display device among the display devices may have increased warpage, and in a case where the thickness of the back cover increases to increase the rigidity of the back cover, the weight and material cost of the back cover and the display device increase.

SUMMARY

An objective of the present invention is to provide a display device which is capable of being lightweight and in which a corrugated panel can be reliably fixed to a module cover.

A display device according to an embodiment of the present invention includes a display panel; and a corrugated panel facing a rear surface of the display panel and having a corrugated core disposed between a front skin and a rear skin. The corrugated panel may have a plurality of first holes formed between the front skin and the corrugated core, and have a plurality of second holes formed between the corrugated core and the rear skin, and, as an example of the corrugated panel, the plurality of first holes and the plurality of second holes may be long in a vertical direction.

The thickness of the rear skin may be equal to or thicker than the thickness of the corrugated core.

The thickness of the corrugated core may be equal to or thicker than the thickness of the front skin.

The display device may further comprises a module cover for covering between the display panel and the corrugated panel; and a first adhesive member for fixing one of the front skin and the rear skin to the module cover.

An example of the module cover may include a first body shielding between a rear surface of the display panel and a front surface of the front skin, and a second body extending from the first body and covering a rear surface of the rear skin, and the first adhesive member may be attached to the rear surface of the rear skin and the front surface of the second body.

The display device may further include a second adhesive member attached to the front skin and the display panel.

The thickness of the corrugated panel may be thicker than the thickness of the first adhesive member and the thickness of the second adhesive member.

The thickness of the first body may be thicker than the sum of the thickness of the first adhesive member, the thickness of the corrugated panel, the thickness of the second adhesive member, and the thickness of the display panel.

The thickness of the first adhesive member may be 0.1 to 1.0 mm. In addition, the thickness of the corrugated panel may be 2 mm to 5 mm.

Another example of the module cover may include a first body shielding between a rear surface of the display panel and a front surface of the front skin, and a second body extending from the first body and disposed between the front skin and the display panel, and the first adhesive member may be attached to the front skin and the second body.

The display device may further include a second adhesive member attached to a second body and the display panel.

The thickness of the corrugated panel may be thicker than the thickness of the first adhesive member and the thickness of the second adhesive member.

The thickness of the first body may be thicker than the sum of the thickness of the first adhesive member, the thickness of the corrugated panel, the thickness of the second adhesive member, and the thickness of the display panel.

The corrugated core may include a first core having a first width in a front and rear direction, and at least one second core having a second width smaller than the first width in the front and rear direction.

A recessed portion which is in contact with the second core may be formed on the front skin. The recessed portion may have a step with a portion of the front skin where the first core is in contact. The recessed portion can be spaced apart from the display panel.

The first adhesive member may be attached to the recessed portion. The second body may be accommodated in the recessed portion.

The recessed depth of the recessed portion may be equal to the sum of the thickness of the first adhesive member and the thickness of the second body or may be greater than the sum of the thickness of the first adhesive member and the thickness of the second body.

A nut may be fixed to the second core and recessed portion.

A recessed portion which is in contact with the second core may be formed on the rear skin, the recessed portion may have a step with a portion of the front skin which is in contact with the first core, and a nut is fixed to the recessed portion.

A bent portion bent to protrude in the rear direction can be formed on the corrugated panel.

According to the embodiment of the present invention, a plurality of first holes between the front skin and the corrugated core and a plurality of second holes between the corrugated core and the rear skin can be formed to be long in the vertical direction, respectively, so that the deflection amount of the corrugated core can be minimized and the corrugated panel can reliably support the display panel.

In addition, the first body of the module cover can shield the gap between the rear surface of the display panel and the front surface of the front skin, the second body of the module cover covers the rear surface of the rear skin to prevent exposure of the rear skin, and the second body of the module cover can protect the rear surface of the rear skin.

In addition, the second adhesive member may be attached to the rear surface of the OLED and the front surface of the front skin, so that the OLED can be directly fixed to the corrugated panel by the second adhesive member.

In addition, since the corrugated core is thin, the corrugated shape can be easily formed, and the formability is high.

In addition, the second body of the module cover can be reliably fixed to the front skin and the display panel and between the front skin and the display panel, respectively.

In addition, since the first adhesive member and the second body are accommodated in the recessed portions formed in the front skin, the step between the front surface of the front skin and the front surface of the second body can be minimized, and the overall thickness of the display device can be minimized than a case where the second body is positioned outside the recessed portion.

In addition, a nut can be press-fitted into the second core and the recessed portion formed the front skin, so that it is possible to minimize the contact of a front end of the nut with the display panel.

In addition, a nut can be press-fitted into the recessed portion formed in the rear skin, so it is possible to minimize the damage of the display panel due to the nut.

DETAILED DESCRIPTION OF THE EMBODIMENTS

Hereinafter, detailed embodiments of the present disclosure will be described in detail with reference to the accompanying drawings.

Figure 1:
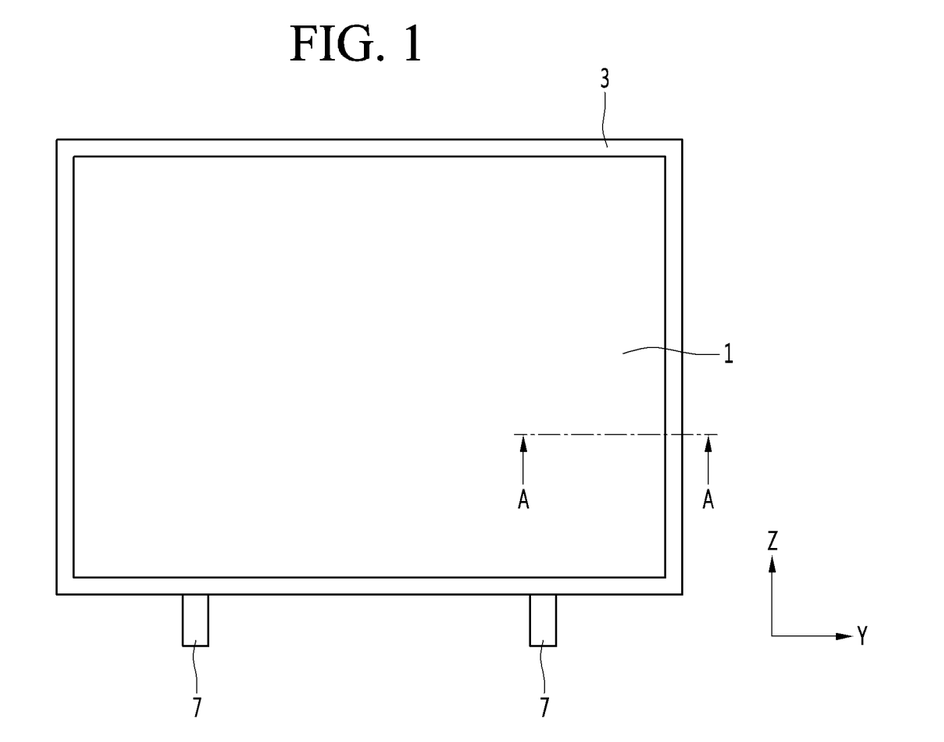
FIG. 1 is a front view illustrating a display device according to an embodiment of the present invention.
Figure 2:
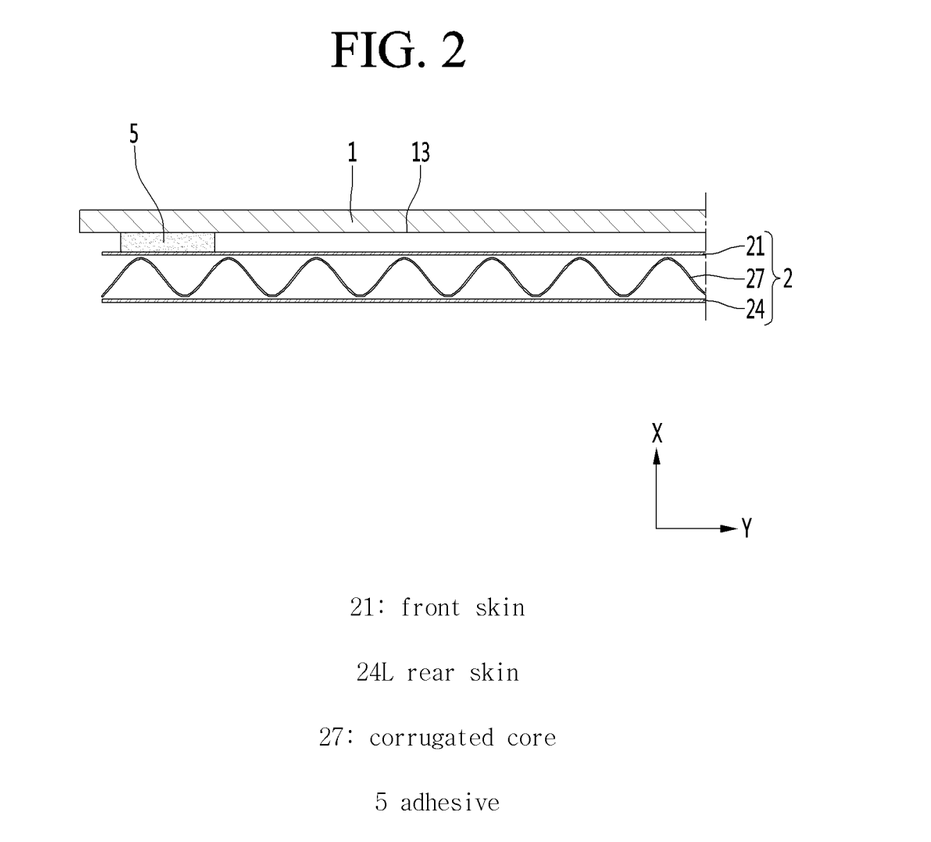
FIG. 2 is a sectional view of the display device according to an embodiment of the present invention.

FIG. 1 is a front view illustrating a display device according to an embodiment of the present invention, FIG. 2 is a sectional view of the display device according to an embodiment of the present invention.

The display device may include a display panel 1; and a corrugated panel 2.

The display device may have a thickness in a front and rear direction X, a length in a left and right direction Y, and a height in a vertical directions Z. The display device may be a polygonal shape disposed to be long in the left and right direction Y.

The display panel 1 displays an image in a front direction. An example of the display panel 1 may be organic light emitting diodes (OLED). Another example of the display panel 1 may include a liquid crystal display (LCD) for displaying an image and a backlight unit for irradiating light to the LCD.

The corrugated panel 2 can face a rear surface 13 of the display panel 1. The corrugated panel 2 supports the display panel 1 and can be disposed behind the display panel 1. In a case where the display panel 1 is the OLED, the corrugated panel 2 can face the rear surface of the OLED.

The corrugated panel 2 comprises a front skin 21, a corrugated core and a rear skin 24.

The corrugated core 27 may be disposed between the front skin 21 and the rear skin 24 in the corrugated panel 2.

The corrugated panel 2 may be attached to the display panel 1 via at least one adhesive member 5. The at least one adhesive member may be attached to the rear surface 13 of the display panel 1.

All or a portion of the corrugated panel 2 may be a back cover forming an outer appearance of the rear surface of the display device.

Figure 3:
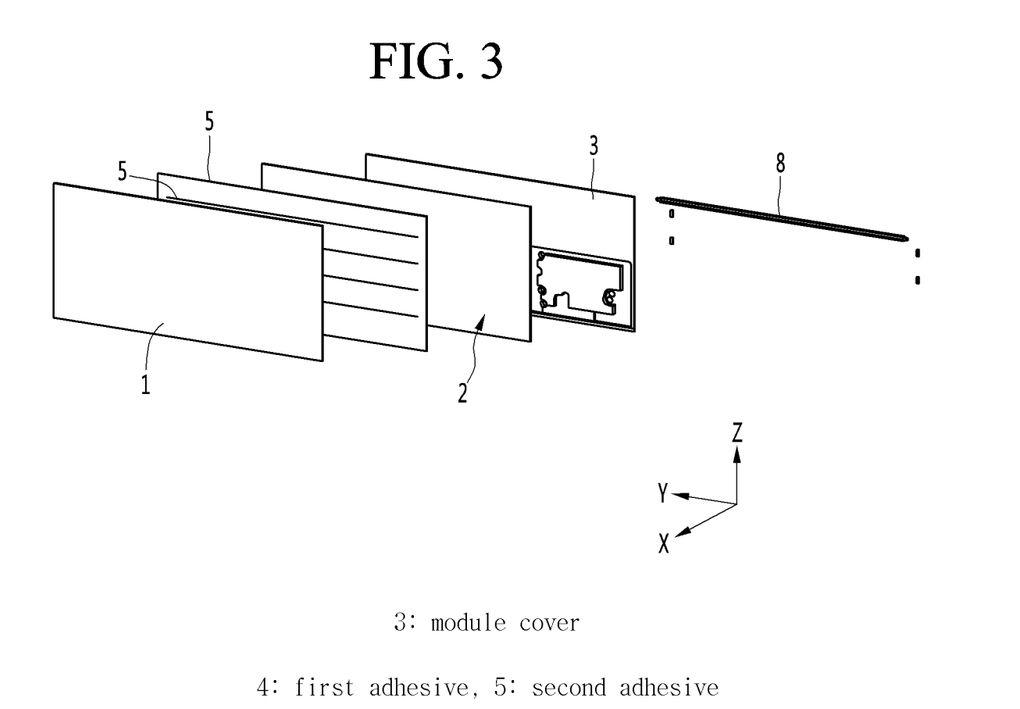
FIG. 3 is an exploded perspective view illustrating a display device according to an embodiment of the present invention.
Figure 4:
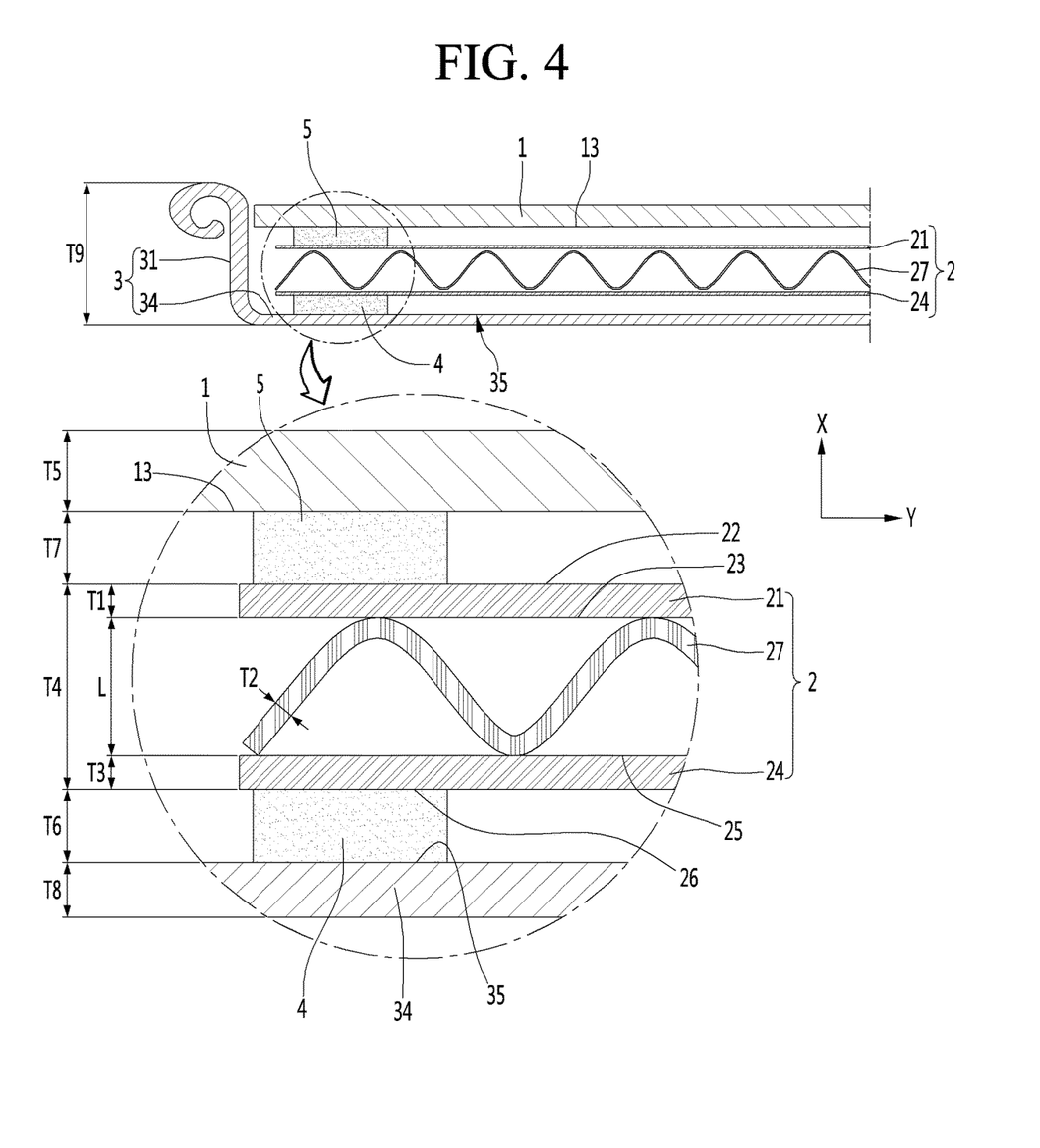
FIG. 4 is a sectional view taken along line A-A illustrated in FIG. 1.
Figure 5:
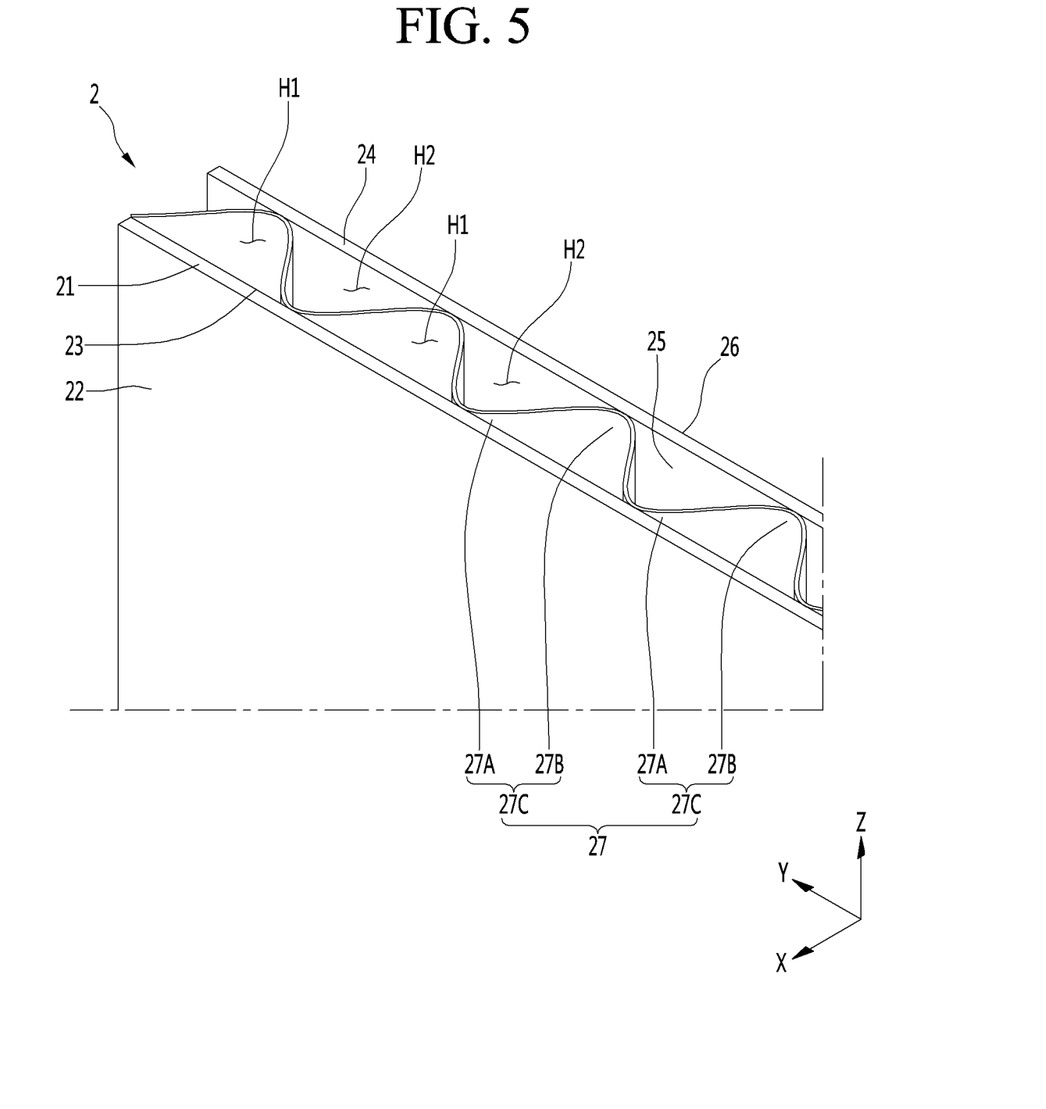
FIG. 5 is a perspective view in which a portion of the corrugated panel illustrated in FIG. 4 is enlarged.

FIG. 3 is an exploded perspective view illustrating a display device according to an embodiment of the present invention, FIG. 4 is a sectional view taken along line A-A illustrated in FIG. 1, and FIG. 5 is a perspective view in which a portion of the corrugated panel illustrated in FIG. 4 is enlarged.

The display device may further comprises a module cover 3; and a first adhesive member 4. The display device may further include a second adhesive member 5.

In a case where the module cover 3 covers the entire rear surface of the corrugated panel 2, the corrugated panel 2 can be disposed between the display panel 1 and the module cover 3 and may be an inner supporter which supports the display panel 1 between the display panel 1 and the module cover 3.

The corrugated panel 2 may be configured with a combination of a plurality of members and may have a thickness in the front and rear direction X, a length in the left and right direction Y, and a height in the vertical direction Z.

The corrugated panel 2 may be disposed between the display panel 1 and the module cover 3. The corrugated panel 2 can be coupled to the module cover 3 by the first adhesive member 4. In addition, the corrugated panel 2 can be coupled to the display panel 1 by the second adhesive member 5. The corrugated panel 2 can be coupled to the display panel 1 and the module cover 3 between the display panel 1 and the module cover 3, respectively. The display panel 1 can be connected to the module cover 3 by means of the second adhesive member 5, the corrugated panel 2, and the first adhesive member 4.

The front skin 21 may be in the form of a flat plate as a whole.

The front surface 22 of the front skin 21 can face the rear surface 13 of the display panel 1. A second adhesive member 5 may be attached to the front surface 22 of the front skin 21.

The rear surface 23 of the front skin 21 can face the corrugated core 27. The rear surface 23 of the front skin 21 can be joined to the front end of the corrugated core 27.

The corrugated core 27 is a wavy corrugated member and may include a unit core 27C of a crest 27A protruding in a front direction and a trough 27B extending from the crest 27A and recessed in a rear direction.

In the corrugated core 27, a plurality of unit cores 27C in which the crests 27A and the troughs 27B are connected to each other may be continuous. A plurality of unit cores 27C may be continuous in a direction orthogonal to the longitudinal direction of the unit core 27C.

The unit core 27C may be formed to be long in the vertical direction Z, and in this case, the plurality of unit cores 27C may be continuous in the left and right direction Y.

The front end of the crest 27A can be joined to the rear surface 23 of the front skin 21 and the rear end of the trough 27B can be joined to the front surface 25 of the rear skin 24.

A plurality of first holes H1 may be formed between the front skin 21 and the corrugated core 27. A plurality of second holes H2 may be formed between the corrugated core 27 and the rear skin 24.

The plurality of first holes H1 and the plurality of second holes H2 may be long in the vertical direction Z. The plurality of first holes H1 and the plurality of second holes H2 may be formed to penetrate the corrugated panel 2 in the vertical direction Z.

In this case, the unit cores 27C of the corrugated core 27 can extend to be long in the vertical direction Z, the plurality of unit cores 27C can be continuous in the left and right direction Y, and each of the plurality of first holes H1 and the plurality of second holes H2 may be opened in the vertical direction Z.

Meanwhile, unlike the above, in the corrugated panel 2, each of the unit cores can be long in the left and right direction Y, the plurality of unit cores can be continuous in the vertical direction Z, and the plurality of first holes and the plurality of second holes can be long in the left and right direction Y.

In a case where each unit core constituting the corrugated core 27 may be disposed long in the left and right direction Y, the deflection amount of a portion of each unit core may be different from the deflection amount of the other portion of the unit core, and the deflection amount of the unit core can be greater than that in a case of being disposed to be long in the vertical direction Z.

It is preferable that the deflection amount of the corrugated panel 2 be minimized and a preferable example of the corrugated panel 2 is that each of unit cores 27C of the corrugated core 27 extends to be long in the vertical direction Z, the plurality of unit cores 27C are continuous in the left and right direction Y, and the plurality of first holes H1 and the plurality of second holes H2 are formed to be long in the vertical direction Z.

Meanwhile, in order to ensure rigidity, it is preferable that the thickness T1 of the front skin 21 increase, but it is preferable that the front skin 21 has an optimum thickness considering the material cost and the total thickness of the display device.

It is preferable that the corrugated core 27 has a thickness T2 as thin as possible in consideration of formability, weight lightening, and material cost in the production of a corrugated structure (that is, wavy structure).

In addition, the rear skin 24 may be a surface exposed to the outside when the corrugated panel 2 is attached to the display panel 1 and preferably the shape of the trough 27B is not exposed to the outside. It is preferable that the thickness T3 of the rear skin 24 increase so that the shape of the trough 27B is not exposed to the outside, but it is preferable that the rear skin 24 has an optimum thickness considering the material cost and the total thickness of the display device.

The thickness T3 of the rear skin 24 may be equal to or thicker than the thickness T2 of the corrugated core 27. The thickness T2 of the corrugated core 27 may be equal to or thinner than the thickness T1 of the front skin 21. Here, the thickness T2 of the corrugated core 27 may be a thickness before the corrugated core 27 is formed into a wavy shape.

The corrugated core 27 may have a width L in the front and rear direction X and the width L of the corrugated core 27 may be a width in the front and rear direction X when the corrugated core 27 is disposed between the front skin 21 and the rear skin 24 after the corrugated core 27 is completely formed into a wavy shape.

The thickness T4 of the corrugated panel 2 may be defined as the sum of the thickness T1 of the front skin 21, the distance L between the front skin 21 and the rear skin 24 (that is, width of corrugated core 27 in the front and rear direction), and the thickness T2 of the rear skin 24.

It is preferable that the corrugated panel 2 be made of a metal material which can be reduced in weight and has a high heat dissipation property and is preferably formed of aluminum having a high thermal conductivity.

The front skin 21, the corrugated core 27, and the rear skin 24 can be formed of the same material, and at least one material can be different from the material of the other configuration.

The front skin 21, the corrugated core 27, and the rear skin 24 constituting the corrugated panel 2 can be hot melt joined to each other. The front skin 21, the corrugated core 27, and the rear skin 24 may all be made of aluminum and the reliability of the joint between the front skin 21 and the corrugated core 27 and the reliability of the joint between the corrugated core 27 and the rear skin 24 may be high.

The module cover 3 may form an outer peripheral appearance of the display device. The module cover 3 may surround the outer periphery of the display panel 1 and the outer periphery of the corrugated panel 2.

The module cover 3 may cover between the display panel 1 and the corrugated panel 2. When viewed from the side of the display device, the module cover 3 may cover so that the gap between the display panel 1 and the corrugated panel 2 is invisible.

To this end, the module cover 3 may include a first body 31 which shields the rear surface 13 of the display panel 1 and the front surface 22 of the front skin 21. The first body 31 may form an upper, lower, left, and right edge outer appearance of the display device.

The module cover 3 may cover the rear surface of the corrugated panel 2. When viewed from the rear of the display device, the module cover 3 may cover the display panel 1 and the corrugated panel 2 so that the display panel 1 and the corrugated panel 2 are invisible.

To this end, the module cover 3 may include a second body 34 covering the rear surface 26 of the rear skin 24. The second body 34 may extend from the first body 31. The second body 34, in whole or in part, can form an outer appearance of the rear surface of the display device. The second body 34 may be formed to be greater than the rear skin 24. Meanwhile, the first body 31 may protrude in the front direction X from the outer periphery of the second body 34.

The module cover 3 may be a pre-painted metal, that is, a pre-coated metal (PCM), and may be a cold-rolled steel plate, a galvanized steel plate, an aluminum steel plate, or the like painted by a PRE-COATING method.

The first adhesive member 4 can fix any one of the front skin 21 and the rear skin 22 to the module cover 3. The second adhesive member 5 can fix the other of the front skin 21 and the rear skin 22 to the display panel 1.

The first adhesive member 4 may be attached to the rear surface 26 of the rear skin 24 and the front surface 35 of the second body 34.

The second adhesive member 5 may be attached to the front surface 22 of the front skin 21 and the display panel 1. The display panel 1 may be an OLED and the second adhesive member 5 may be attached to the front surface 22 of the front skin 21 and the rear surface 13 of the OLED 1, and in this case, the second adhesive member 5 may be attached to the rear surface 13 of the OLED 1 to fix the OLED 1 directly to the corrugated panel 2.

The first adhesive member 4 and the second adhesive member 5 can be positioned with the corrugated panel 2 therebetween.

The first adhesive member 4 and the second adhesive member 5 may be double-sided tapes of the same material.

The first adhesive member 4 may be a rear adhesive member attached to the rear surface of the corrugated panel 2 and the second adhesive member 5 may be a front adhesive member attached to the front surface of the corrugated panel 2.

Each of the first adhesive member 4 and the second adhesive member 5 may be the double-sided tapes, have the same or different materials, and have the same or different thicknesses.

The first adhesive member 4 may not be attached to the entire rear surface of the corrugated panel 2 but may be attached to a portion of the rear surface of corrugated panel 2. The rear surface of the corrugated panel 2 may be the rear surface 26 of the rear skin 24.

The second adhesive member 5 is not attached to the entire front surface of the corrugated panel 2 but can be attached to a portion of the front surface of the corrugated panel 2. The front surface of the corrugated panel 2 may be the front surface 22 of the front skin 21.

It is preferable that the entire thickness of the display device in the front and rear direction X is minimized and that the display device is supported with high reliability as a whole without shaking or sagging even when the size of the display device is large.

It is preferable that each of the components constituting the display device, for example, the display panel 1, the second adhesive member 5, the corrugated panel 2, the first adhesive member 4, and the module cover 3, have a thickness that can minimize shaking or bending of the display device.

The thickness $T5$ of the display panel 1 may be different depending on a screen size thereof and may be 1.02 mm, for example.

The thickness ($T4=T1+L+T3$) of the corrugated panel 2 may be thicker than the thickness $T6$ of the first adhesive member 4 and the thickness $T7$ of the second adhesive member 5. The thickness $T4$ of the corrugated panel 2 may be 2 mm to 5 mm.

The thickness of the module cover 3, in particular, the thickness $T8$ of the second body 34 may be 0.6 mm to 0.8 mm.

The first adhesive member 4 and the second adhesive member 5 may be double-sided tapes of the same material, and the respective thicknesses ($T6=T7$) thereof may be 0.1 mm to 1 mm.

The width $T9$ of the first body 21 in the front and rear direction may be greater than the sum ($T6+T4+T7+T5$) of the thickness $T6$ of the first adhesive member 4, the thickness $T4$ of the corrugated panel 2, the thickness $T7$ of the second adhesive member 5, and the thickness $T5$ of the display panel 1.

Reference numeral 7 illustrated in FIG. 1 may be a stand 7 coupled with at least one of the corrugated panel 2 and the module cover 3.

In a case where the stand 7 is coupled to the module cover 3, the module cover 3, particularly the second body 34, can be fitted with a nut to which a fastening member such as a bolt can be fastened.

On the other hand, in a case where the stand 7 is coupled to the corrugated panel 2, a nut to which a fastening member such as a bolt can be fastened can be mounted on the corrugated panel 2.

Meanwhile, Reference numeral 8 illustrated in FIG. 3 denotes a PCB plate 8 which is fastened to the corrugated panel 2 or the module cover 3 with a fastening member such as a bolt or a nut and the PCB plate 8 may cover a PCB (no reference numeral) connected to the display panel 1 through a flexible circuit board or an electric wire or the like and can protect such a PCB.

Figure 6:
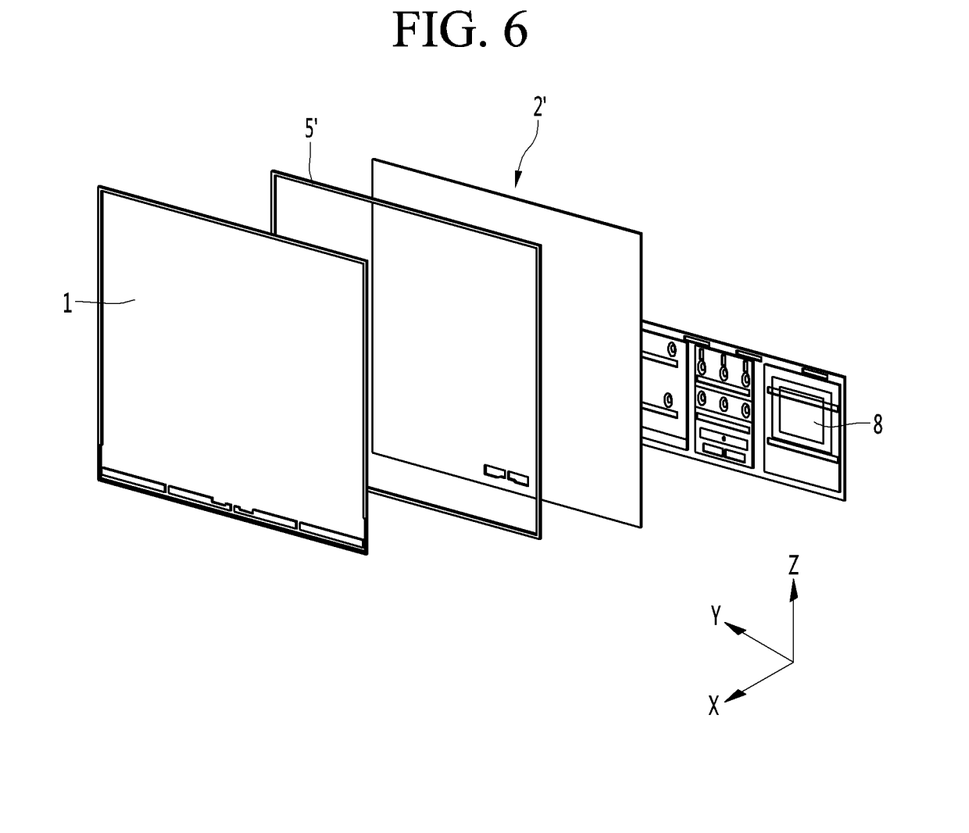
FIG. 6 is an exploded perspective view illustrating a display device according to another embodiment of the present invention.
Figure 7:
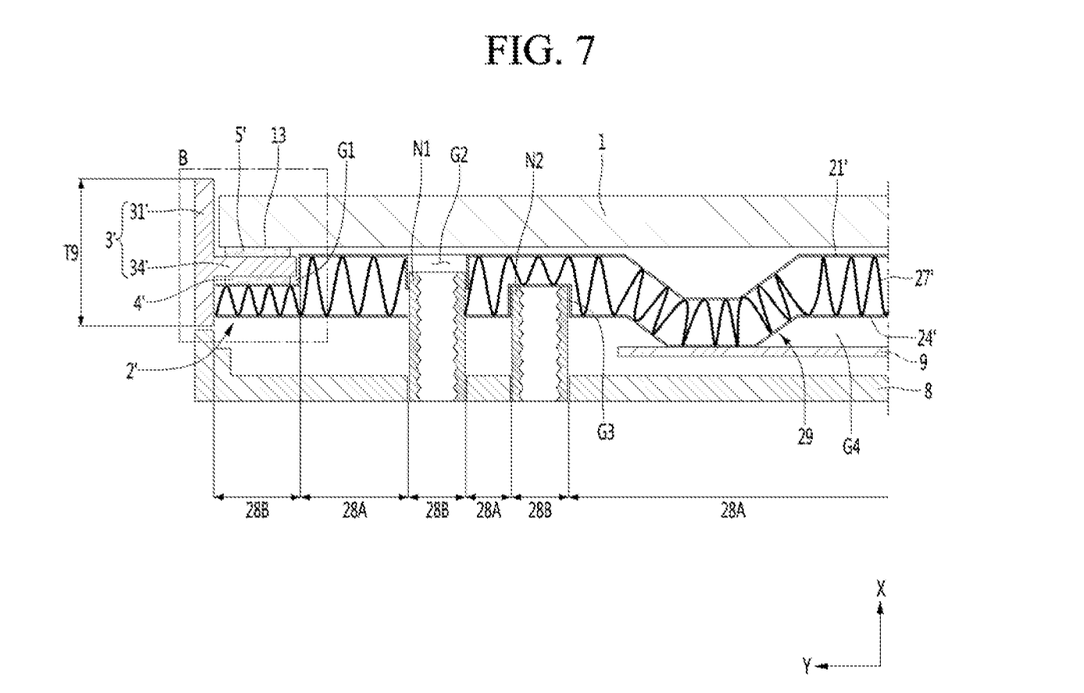
FIG. 7 is a sectional view of a display device according to another embodiment of the present invention.
Figure 8:
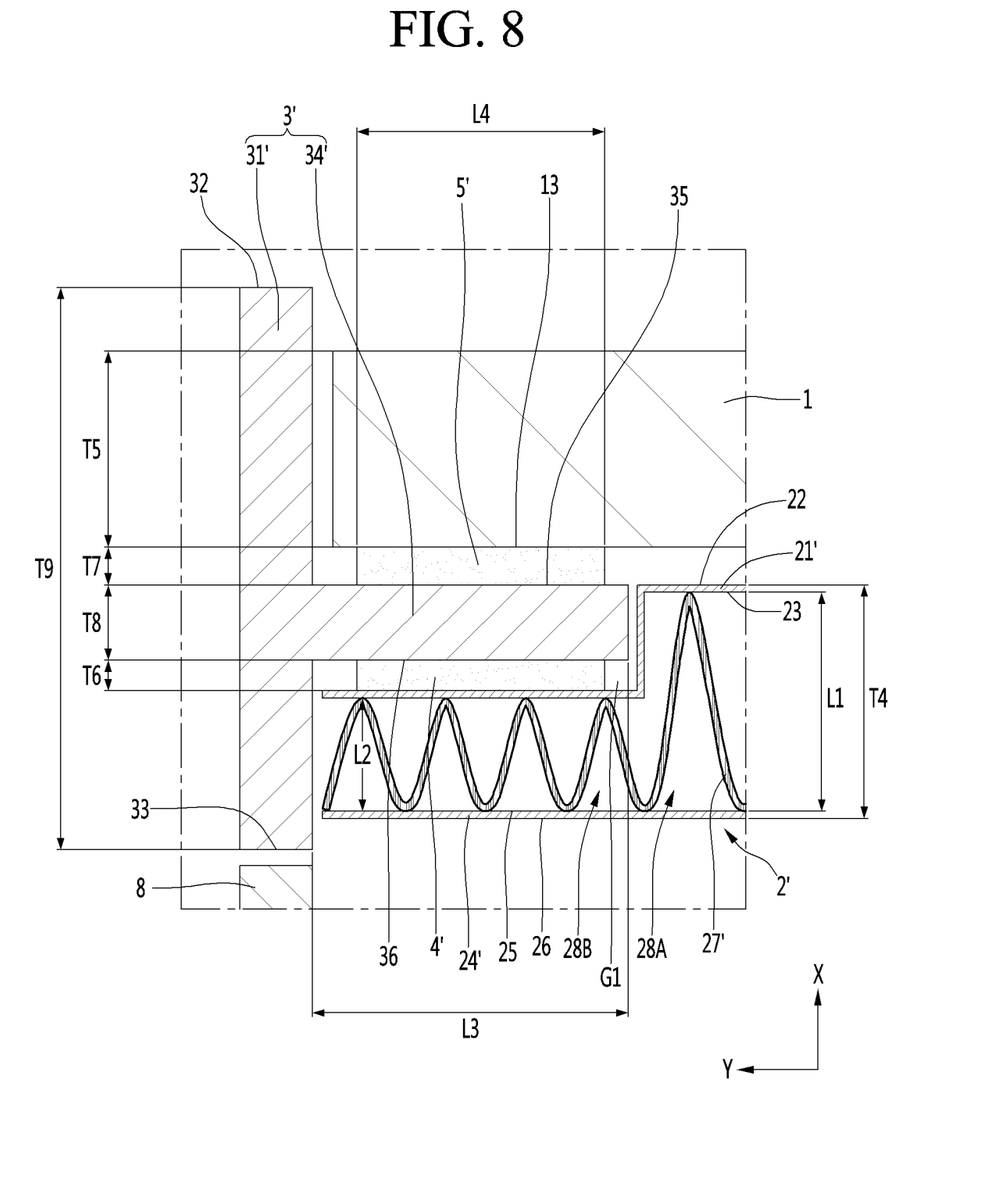
FIG. 8 is an enlarged sectional view of portion B in FIG. 7.

FIG. 6 is an exploded perspective view illustrating a display device according to another embodiment of the present invention, FIG. 7 is a sectional view of a display device according to another embodiment of the present invention, and FIG. 8 is an enlarged sectional view of portion B in FIG. 7.

The present embodiment can include a display panel 1, a corrugated panel 2', a module cover 3', a first adhesive member 4', and a second adhesive member 5', since the display panel 1 is the same as the embodiment of the present invention, the same reference numerals are used, and a detailed description thereof will be omitted.

The corrugated panel 2' includes a front skin 21', a rear skin 24', and a corrugated core 27' disposed between the front skin 21' and the rear skin 24'.

Hereinafter, with respect to the front skin 21', the same configurations as those of the front skin 21 of the embodiment of the present invention among the configurations of the front skin 21' are omitted in order to avoid duplicate description, and will be described with respect to only the different configurations from those of the front skin 21 of the embodiment of the present invention.

In addition, with respect to the rear skin 24', the same configuration as those of the rear skin 24 of the embodiment of the present invention among the configurations of the rear skin 24' are omitted in order to avoid duplicate description, and will be described with respect to only the different configurations from those of the rear skin 24 of the embodiment of the present invention.

Meanwhile, with respect to the corrugated core 27', the same configurations as those of the corrugated core 27 of the embodiment of the present invention among the corrugated core 27' is omitted in order to avoid duplicate description, and will be described with respect to only the different configurations from those of the corrugated core 27 of the embodiment of the present invention.

The module cover 3' can include a first body 31' which shields between the rear surface 13 of the display panel 1 and the front surface 22 of the front skin 21 and a second body 31' which extends from the first body 31', and the second body 34' may be disposed between the front skin 21' and the display panel 1.

The second body 34' may protrude from a surface among both surfaces of the first body 31' facing the corrugated panel 2'. The second body 34' may protrude between the front end 32 and the rear end 33 of the first body 31' in the left and right direction Y or the vertical direction Z. A portion of the second body 34' may be positioned between the display panel 1 and the corrugated panel 2' and may be positioned so as to overlap each of the display panel 1 and the corrugated panel 2' in the front and rear direction X.

The first body 31' may be an outer body forming an outer peripheral surface of the display device and the second body 34' may be an inner body protruding from a surface of the first body 31' facing the display panel 1 and the corrugated panel 2'.

The width L3 of the second body 34' may be greater than each of the width L4 of the portion of the first adhesive member 4' attached to the second body 34' and the width L4 of the second adhesive member 5' attached to the second body 34'.

This second body 34' does not cover the rear surface of the corrugated panel 2'. In other words, the second body 34' does not cover the rear surface 26 of the rear skin 24'. The rear surface of the corrugated panel 2' is not covered by the module cover 2', and all or a portion of the rear surface of the corrugated panel 2' may be exposed to the outside.

The display device may further include a PCB 9 connected to the display panel 1, and a PCB plate 8 for protecting the PCB 9 as illustrated in FIG. 7.

The PCB 9 can be connected to the display panel 1 through a flexible circuit board or an electric wire.

The PCB plate 8 may be smaller than the corrugated panel 2' and disposed behind the corrugated panel 2' so as to cover only a portion of the rear surface of the corrugated panel 2'.

The first adhesive member 4' can be attached to the front skin 21' and the second body 34', and the second adhesive member 5' can be attached to the second body 34' and the display panel 1.

The first adhesive member 4' may be a rear adhesive member attached to the rear surface 36 of the second body 34' and the second adhesive member 5' may be a front adhesive member attached to the front surface 35' of the second body 34'.

The thickness T4 of the corrugated panel 2' can be thicker than the thickness T6 of the first adhesive member 4' and the thickness T7 of the second adhesive member 5', as in the embodiment of the present invention.

The width T9 of the first body 31 in the front and rear direction can be thicker than the sum(T4+T7+T5) of the thickness T4 of the corrugated panel 2', the thickness T7 of the second adhesive member 5', and the thickness T5 of the display panel 1.

The corrugated core 27' may include a first core 28A having a first width L1 in the front and rear direction X and a second core 28B having a second width L2 in the front and rear direction which is smaller than the first width L1.

At least one second core 28B may extend from the first core 28A. Each of the first core 28A and the second core 28B may include crests and troughs.

The corrugated core 27' may include a plurality of second cores 28B and the plurality of second cores 28B may be spaced apart from one another on the corrugated core 27'. The first core 28A may be a portion of the corrugated core 27' except for the plurality of second cores 28B.

The first core 28A and the second core 28B may be configured to be distinguished from each other with reference to the width in the front and rear direction X and the first core 28A and the second core 28B may be formed on one corrugated core 27'.

The front skin 21' may include a portion which is in contact with the first core 28A and a portion which is in contact with the second core 28B.

The portion of the front skin 21', which is in contact with the first core 28A, may be the first core contacting portion and may be a non-recessed portion formed in a flat plate shape and not recessed in the rear direction.

The front skin 21' may be formed with a recessed portion G1 which is in contact with the second core 28B. The recessed portion G1 may have a step with the portion of the front skin 21' with which the first core 28A is contacted. The recessed portion G1 may be spaced apart from the display panel 1.

The recessed portion G1 may be a second core contacting portion which is bent into a step with the first core contacting portion (that is, non-recessed portion) and is in contact with the second core 28B.

The first adhesive member 4' may be attached to the recessed portion G. In addition, the second body 34' can be accommodated in the recessed portion G1. The second body 34' can be accommodated in the recessed portion G1 together with the first adhesive member 4'.

The recessed depth of the recessed portion G1 may be equal to or greater than the sum of the thickness T6 of the first adhesive member 4' and the thickness T8 of the second body 34'.

In this case, the front surface 35 of the second body 34' and the front surface 22 of the front skin 21' can be matched in the left and right direction Y without having a step.

The recessed portion G1 in which the first adhesive member 4 'and the second body 34' are accommodated may be an outer recessed portion G1 (see FIG. 7 and FIG. 8) formed along the edge of the front skin 21'.

As illustrated in FIG. 7, the front skin 21' can be formed with a recessed portion G2 (see FIG. 7) which has a step with a portion of the front skin 21' with which the first core 28A is in contact, is in contact with the second core 28B, and is spaced apart from the display panel 1, and a nut N1 can be fixed in the second core 28B. The recessed portion G2 of the front skin 21' to which the nut N1 is fixed can be a separate recessed portion spaced apart from the recessed portion G1 in which the first adhesive member 4' and the second body 34' are accommodated, and may be an inner recessed portion G2 formed inside an edge of the front skin 21', not on edge of the front skin 21'. The nut N1 may pass through the second core 28B, and a portion thereof may be positioned inside the inner recessed portion G2.

Meanwhile, as illustrated in FIG. 7, the rear skin 21' may be formed with a recessed portion G3 (see FIG. 7) which has a step with a portion of the rear skin 24 with which the first core 28A is in contact and is in contact with the second core 28B, and a nut N2 is fixed to the recessed portion G3. The recessed portion G3 formed in the rear skin 24 may be a recessed portion formed on the rear surface of the corrugated panel 2' and may be a rear recessed portion G3. The rear recessed portion G3 may be formed at a position which does not overlap the recessed portions G1 and G2 formed in the front skin 21' in the front and rear direction.

The corrugated panel 2' can be coupled with at least one of the stand 7 (see FIG. 1) and the PCB plate 8 using a bolt.

In a case where the corrugated panel 2' is coupled with the stand 7 or the PCB plate 8, the bolt passes through the bolt through-holes formed in the stand 7 or the PCB plate 8, and be fastened to the nuts N1 and N2 mounted on the corrugated panel 2'.

When the bolt is fastened to the nuts N1 and N2, it is preferable that the nuts N1 and N2 be mounted so that the bolts do not interfere with the display panel 1 when the bolt is completely fastened to the nuts N1 and N2.

When the nuts N1 and N2 are fixed to the corrugated panel 2', it is preferable that the front ends of the nuts N1 and N2 be fastened so as to be spaced apart from the rear surface of the display panel 1, the nut N1 press-fitted into the inner recessed portion G2 of the front skin 21' or the nut N2 press-fitted into the rear recessed portion G3 of the rear skin 24' can keep a state of being spaced apart from the display panel 1.

Meanwhile, the corrugated panel 2' may be formed with a bent portion 29 which is bent to protrude in the rear direction.

The bent portion 29 may be a portion where the front surface of the corrugated panel 2' is recessed and the rear surface thereof protrudes, and the thickness thereof (that is, width in front and rear direction) may be the same portion as the peripheral portion of the bent portion 29.

The bent portion 29 may include a portion of the first core 28A which is bent from the peripheral portion in the rear direction, a portion of the front skin 21' which is bent from the peripheral portion in the rear direction, and a portion of the rear skin 24' which is bent from the peripheral portion in the rear direction.

The bent portion 29 is a configuration which causes the PCB 9 to be capable of being spaced apart from the periphery of the bent portion 29, the PCB 9 can be in contact with or be fastened to the bent portion 29, and a gap G4 can be formed between the periphery of the bent portion 29 and the PCB 9.

The above-disclosed subject matter is to be considered illustrative, and not restrictive, and the appended claims are intended to cover all such modifications, enhancements, and other embodiments, which fall within the scope of the present disclosure.

Thus, the embodiments of the present disclosure is to be considered illustrative, and not restrictive.

Therefore, the scope of the claimed invention is defined not by the detailed description of the disclosure but by the appended claims, and all differences within the scope should be construed as being included in the appended claims.

What is claimed is:

1. A display device comprising: a display panel; a panel disposed at a rear of the display panel; a module cover configured to cover the display panel and the panel; and a plate disposed at a rear of the panel, wherein the module cover comprises a first body covering a side surface of the display panel and a second body integrally formed with the first body and extending from the first body to be disposed between the panel and the display panel, wherein a rear surface of the second body is attached to a front of the panel, wherein the front surface of the second body is directly attached to a rear surface of the display panel, wherein a nut is fixed at the panel, wherein the plate and the panel are secured together by a securing member fastened to the nut, wherein the front of the panel comprises an inner recessed portion at a position of the nut such that a front side of the nut is spaced apart from a rear of the display panel, and wherein the front side of the nut is positioned closer to the rear of the display panel than the rear surface of the second body.

2. The display device of claim 1, wherein the plate comprises a through hole corresponding to a position of the nut to allow the securing member to pass therethrough to be fastened to the nut.

3. The display device of claim 1, wherein the nut is fixed at the panel by being press fitted.

4. The display device of claim 1, wherein the panel comprises a recessed portion spaced apart from the display panel,
wherein a rear surface of the second body is attached to the recessed portion of the panel, and
wherein the front surface of the second body is substantially coplanar with a front surface of the panel.

5. The display device of claim 1, wherein the display panel is an organic light emitting diode (OLED) display panel.

6. The display device of claim 1, wherein the panel is corrugated.

7. The display device of claim 6, wherein the corrugated panel comprises a core disposed between a front skin and a rear skin,
wherein the panel comprises a plurality of first spaces defined between the front skin and the core and a plurality of second spaces defined between the core and the rear skin, and
wherein the plurality of first spaces and the plurality of second spaces are elongated along a vertical direction.

8. The display device of claim 7, wherein the front skin and the rear skin are made of aluminum.

9. The display device of claim 7, wherein a thickness of the rear skin is greater than or equal to a thickness of the core.

10. The display device of claim 9, wherein a thickness of the core is less than or equal to a thickness of the front skin.

11. The display device of claim 7, wherein a material of the core is different from a material of the front skin and a material of the rear skin.

12. The display device of claim 1, further comprising an adhesive member which is attached to the second body and the display panel.

13. The display device of claim 12, wherein a measurement of the first body in a front and rear direction is greater than a sum of thicknesses of the panel, the adhesive member, and the display panel in the front and rear direction.

14. A display device comprising: a display panel; a panel disposed at a rear of the display panel; a plate disposed at a rear of the panel; and a module cover configured to cover the display panel and the panel, the module cover comprising a first body covering a side surface of the display panel and a second body integrally formed with the first body and extending from the first body to be disposed between the panel and the display panel, wherein the panel comprises a recessed portion spaced apart from the display panel, wherein a rear surface of the second body is attached to the recessed portion of the panel, wherein the front surface of the second body is directly attached to a rear surface of the display panel and is substantially coplanar with a front surface of the panel, wherein a nut is fixed at the panel, wherein the plate and the panel are secured together by a securing member fastened to the nut, wherein the front of the panel comprises an inner recessed portion at a position of the nut such that a front side of the nut is spaced apart from a rear of the display panel, and wherein the front side of the nut is positioned closer to the rear of the display panel than the rear surface of the second body.

15. The display device of claim 14, wherein the plate comprises a through hole corresponding to a position of the nut to allow the securing member to pass therethrough to be fastened to the nut.

16. The display device of claim 14, wherein the panel is corrugated and comprises a core disposed between a front skin and a rear skin,
   wherein the panel comprises a plurality of first spaces defined between the front skin and the core and a plurality of second spaces defined between the core and the rear skin, and
   wherein the plurality of first spaces and the plurality of second spaces are elongated along a vertical direction.

17. The display device of claim 16, wherein the front skin and the rear skin are made of aluminum.

* * * * *